United States Patent
Klemba et al.

(10) Patent No.: US 7,519,602 B2
(45) Date of Patent: Apr. 14, 2009

(54) SYSTEMS AND METHODS FOR INFORMATION EXCHANGE USING OBJECT WAREHOUSING

(75) Inventors: Keith S. Klemba, Palo Alto, CA (US); Matthias U. Kaiser, Mountain View, CA (US); Shuyuan Chen, Palo Alto, CA (US); Frankie H. James, Sunnyvale, CA (US)

(73) Assignee: SAP AG, Walldorf (DE)

( * ) Notice: Subject to any disclaimer, the term of this patent is extended or adjusted under 35 U.S.C. 154(b) by 201 days.

(21) Appl. No.: 11/590,332

(22) Filed: Oct. 31, 2006

(65) Prior Publication Data

US 2008/0104260 A1    May 1, 2008

(51) Int. Cl.
*G06H 7/00* (2006.01)
*G06F 17/16* (2006.01)

(52) U.S. Cl. .............. 707/10; 707/1; 707/2; 707/100; 709/228; 709/230

(58) Field of Classification Search ............. 707/1–10, 707/100–102, 104.1; 709/228, 230
See application file for complete search history.

(56) References Cited

U.S. PATENT DOCUMENTS

| | | | |
|---|---|---|---|
| 7,185,046 B2 * | 2/2007 | Ferstl et al. | 709/201 |
| 7,317,697 B2 * | 1/2008 | Lewis et al. | 370/312 |
| 2001/0036822 A1 | 11/2001 | Mead et al. | |
| 2001/0036823 A1 * | 11/2001 | Van Lieshout et al. | 455/418 |
| 2002/0006112 A1 * | 1/2002 | Jaber et al. | 370/238 |
| 2002/0152315 A1 * | 10/2002 | Kagan et al. | 709/228 |
| 2003/0041107 A1 * | 2/2003 | Blattner et al. | 709/204 |
| 2003/0087638 A1 | 5/2003 | Taylor | |
| 2004/0024849 A1 | 2/2004 | El-Beik | |

(Continued)

FOREIGN PATENT DOCUMENTS

EP    1263233 A2    12/2002

(Continued)

OTHER PUBLICATIONS

"SITS: A System for Uniform Intermodal Freight Transport Information Exchange"—Eugene Durr and G. A. Giannopoulos—International Journal of Transport Management Dec. 1, 2003 (pp. 175-186).*

(Continued)

*Primary Examiner*—John E Breene
*Assistant Examiner*—Anh Ly
(74) *Attorney, Agent, or Firm*—Fountainhead Law Group P.C.

(57) ABSTRACT

Embodiments of the present invention improve information exchange, and in particular, the exchange of data objects between different software systems. In one embodiment, the present invention includes a method of exchanging information comprising receiving a first transport request, the transport request comprising one or more first transport attributes, wherein the one or more first transport attributes are associated with a first data object, storing the one or more first transport attributes and the first data object or a reference to the first data object in a repository, receiving a second transport request, the second transport request comprising one or more second transport attributes, and executing an algorithm for generating a response to the second transport request based on the first or second transport attributes.

39 Claims, 4 Drawing Sheets

U.S. PATENT DOCUMENTS

| | | | |
|---|---|---|---|
| 2005/0273497 A1* | 12/2005 | Patrick et al. | 709/206 |
| 2006/0031407 A1* | 2/2006 | Dispensa et al. | 709/219 |
| 2006/0069946 A1* | 3/2006 | Krajewski et al. | 714/6 |
| 2006/0178997 A1* | 8/2006 | Schneck et al. | 705/50 |
| 2006/0190610 A1* | 8/2006 | Motegi et al. | 709/228 |
| 2007/0073845 A1* | 3/2007 | Reisman | 709/219 |
| 2007/0112811 A1* | 5/2007 | Shen et al. | 707/101 |

FOREIGN PATENT DOCUMENTS

| | | |
|---|---|---|
| WO | 98/47268 A1 | 10/1998 |
| WO | 00/14987 A1 | 3/2000 |
| WO | 02/35359 A2 | 5/2002 |
| WO | 03/100640 A1 | 12/2003 |
| WO | 2006/063868 A1 | 6/2006 |

OTHER PUBLICATIONS

"An Internet-Based Geographic Information System that Integrates Data, Models and Users for Transportation Applications"—Athanasios K. Ziliaskopoulos and S. Travis Walker—Transportation Research Part C (Aug. 2000) (pp. 427-444).*

Extended European Search Report (EESR) (from a corresponding foreign application), EP 07 024 166.6, mailed Aug. 1, 2008.

* cited by examiner

SYSTEMS AND METHODS FOR INFORMATION EXCHANGE USING OBJECT WAREHOUSING

BACKGROUND

The present invention relates to computer software applications, and in particular, to systems and methods for information exchange using object warehousing.

Data moves between software systems to support an ever increasing number of applications. Data varies in type, size, frequency, and format. Classically, the movement of data has been treated as a data distribution model supported by a communication network. This approach has worked in environments that provide underlying features such as a common and unified namespace, fixed or stable address space, persistent and reliable communication channels, and homogeneous deployment schemes. Unfortunately, these features are not always present in modern data mobile communication systems.

For example, a mobile system such as a vehicle may not be able to support the traditional foundational requirements that enable seamless information exchange. Given the 10 to 15 year lifespan of a vehicle, even a modest sized fleet will have vehicles that span several technological and regulatory eras. For instance, some vehicles may have Component Area Network (CAN) 2.0 technology, while others may have simple common wired components. However, vehicles and other wireless systems (i.e., mobile devices) have inherent coverage limitations that, in turn, lead to handoffs, name changes, and address changes over time. Moreover, many modern wireless devices are not always turned on, making the network availability of the device difficult to determine for the purposes of information exchange.

One solution to the problem of information exchange is to include a buffering system between software applications. A buffer may be used so that the sender fills the buffer and the receiver empties the buffer. The sending and retrieving actions may be displaced in time, allowing different systems to exchange information without a direct communication link between the sender and receiver. Examples of buffering systems include email, instant messaging, voice mail, and message queues. In these types of systems an apparatus is placed between the sender and receiver where messages can be buffered until the recipient is ready to receive them. However, many existing solutions overlay a unique name space and data model. The buffering component is uniquely aware of both the name space conventions as well as the specific domain data model, making contemporary information exchange systems rigidly tied to the underlying implementations.

What is needed is a flexible system capable of supporting intermittent connectivity, changing addresses, namespace mismatches, different communication mediums, or the growing need for security, for example, or a combination of such issues.

Thus, there is a need for improved systems and methods for exchanging information. The present invention solves these and other problems by providing improved systems and methods for information exchange using object warehousing.

SUMMARY

Embodiments of the present invention improve information exchange, and in particular, the exchange of data objects between different software systems. In one embodiment, the present invention includes a method of exchanging information comprising receiving a first transport request, the transport request comprising one or more first transport attributes, wherein the one or more first transport attributes are associated with a first data object, storing the one or more first transport attributes and the first data object or a reference to the first data object in a repository, receiving a second transport request, the second transport request comprising one or more second transport attributes, and executing an algorithm for generating a response to the second transport request based on the first or second transport attributes.

In one embodiment, the one or more first transport attributes of the first transport request specify a distribution policy, and wherein the algorithm is a specified distribution policy from a plurality of distribution policies for providing retrieval of the first data object.

In one embodiment, the plurality of distribution policies include one or more broadcast, multicast, replication, or time based distribution policies.

In one embodiment, the first transport request is received from a first software system and the second transport request is received from a second software system.

In one embodiment, the method further comprises receiving a second data object comprising a rule, and accessing said rule and processing the first data object based on the first or second transport attributes and said rule.

In one embodiment, the method further comprises signaling a software system based on the first or second transport attributes.

In one embodiment, the algorithm performs an authentication using the first or second transport attributes.

In one embodiment, the first transport request is received over the Internet and includes an instruction for activating a storing software service, and the second transport request is received over the Internet and includes an instruction for activating a retrieving software service.

In one embodiment, the method further comprises establishing a first connection with a first software system over a first communication medium, and establishing a second connection with a second software system over a second communication medium.

In one embodiment, the repository is a database system.

In one embodiment, the repository is a distributed database system.

In one embodiment, the first transport request or the second transport request is received from an application, a mobile device, a software service, or an object warehouse.

In one embodiment, the mobile device is a vehicle.

In one embodiment, the repository is accessed using a fixed network address.

In another embodiment, the present invention includes a computer software system comprising a transport controller for receiving transport requests, the transport requests including transport information and associations to data objects, wherein said transport controller manipulates the distribution of data objects based on the transport information, an object repository for storing the data objects; and a rule engine for accessing and executing policies, wherein received transport information specifies one or more policies for controlling the processing of data objects from the object repository.

In one embodiment, the transport controller comprises a plurality of software services.

In one embodiment, the plurality of software services comprise storing a data object and associated transport information in said object repository and retrieving a data object from said object repository.

In one embodiment, the transport controller is coupled to at least two different communication mediums.

In one embodiment, the transport controller receives one or more second transport requests comprising attributes, and data objects are retrieved by the second transport requests based on the attributes of the second transport requests and the specified policies.

In one embodiment, the policies are distribution policies.

In one embodiment, the policies are security policies.

In one embodiment, the object repository stores said data object.

In one embodiment, the object repository stores a reference to said data object.

In one embodiment, the rule engine manipulates data objects based on transport information according to rules stored in said object repository.

In one embodiment, the transport controller is couple to at least one vehicle.

In one embodiment, the repository is accessed using a fixed network address.

In one embodiment, the present invention includes a method of exchanging information comprising receiving a data object and a plurality of associated first attributes, storing the data object in a repository, receiving a plurality of requests from one or more external systems, each request comprising second attributes, and executing an algorithm, wherein the algorithm causes the stored data object to be replicated based on at least a portion of the first or second attributes.

In one embodiment, the algorithm causes the stored data object to be replicated based on at least a portion of the first and second attributes.

In one embodiment, the algorithm is a distribution policy algorithm.

In one embodiment, the distribution policy algorithm specifies a communication medium.

In one embodiment, the distribution policy algorithm specifies attributes of retrieving entities.

In one embodiment, the distribution policy algorithm specifies a maximum number of copies of the data object.

In one embodiment, the distribution policy algorithm specifies a time for retrieving the data object.

In one embodiment, the algorithm is a security algorithm.

In one embodiment, the security algorithm performs authentication.

In one embodiment, the security algorithm performs encryption or decryption.

In one embodiment, the security algorithm performs authentication based on a type of connection.

In one embodiment, the algorithm causes copies of the data object to be sent to a predefined group of recipients.

In one embodiment, the algorithm causes a copy of the data object to be sent to a single recipient.

In one embodiment, the algorithm allows a recipient to retrieve a copy of data object a predetermined number of times before the object is deleted.

In one embodiment, the algorithm is a time based algorithm. For example, the algorithm may specify that a data object may only be retrieved after a certain time period, during a time window (e.g., on a specified day or days of the week), or will be deleted after a certain time period.

The following detailed description and accompanying drawings provide a better understanding of the nature and advantages of the present invention.

DETAILED DESCRIPTION

Described herein are techniques for exchanging information. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
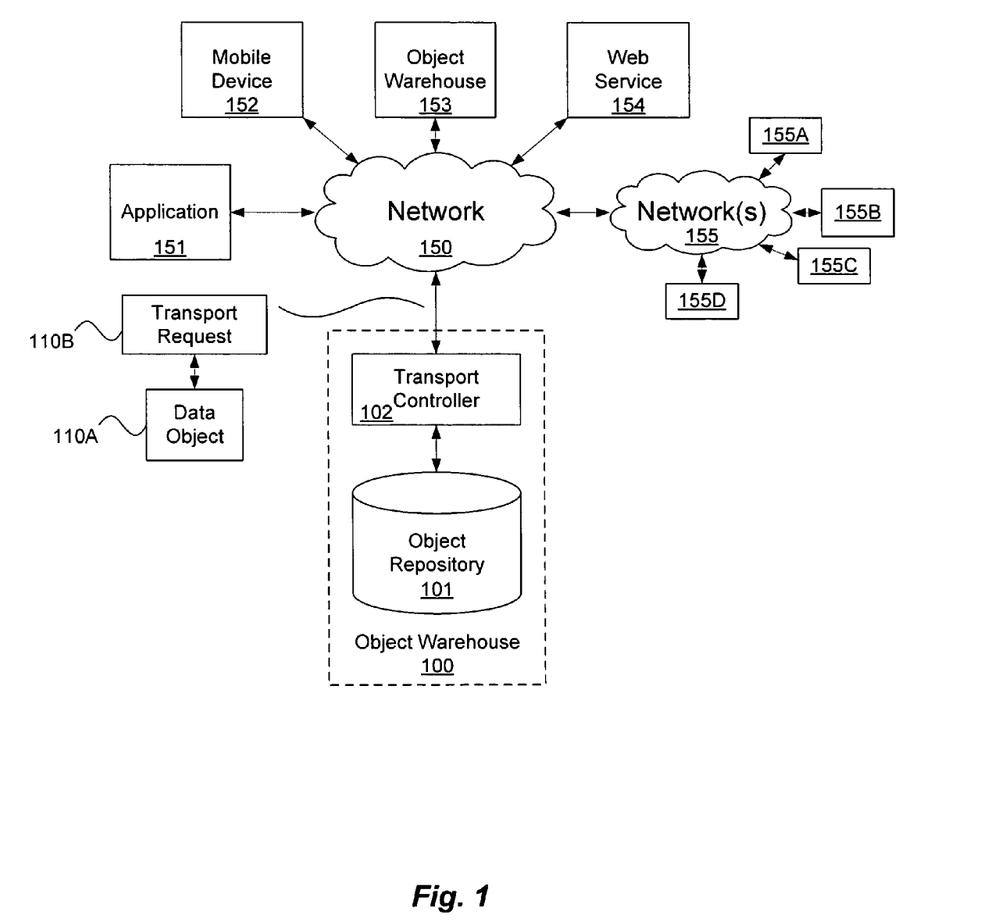
FIG. 1 illustrates an object warehouse according to one embodiment of the present invention.

FIG. 1 illustrates an object warehouse 100 according to one embodiment of the present invention. In one embodiment, object warehouse 100 includes an object repository 101 and transport control software 102. Object warehouse 100 may enable information exchange between a variety of software systems over different networks by providing a controlled mechanism for storing and distributing information as the information is passed between different systems. In some embodiments, software systems may even use object warehouse 100 as place for storing data to be used at another time in the same system. Object warehouse 100 may receive and store information from an application 151, mobile device 152, another object warehouse 153, a software service 154 (e.g., a web service), or any other device or system using software for data communication over network 150. The information stored in repository 101 may be retrieved by only one recipient (i.e., a retrieving entity, retriever, or consumer) or multiple recipients under the control of transport controller 102. For example, stored information may be sent to a single recipient (e.g., another application) when the intended recipient of the information issues an instruction (e.g., a pick up request) to object warehouse 100. Furthermore, transport information (e.g., transport attributes) may be received and stored by object warehouse 100 and used by transport controller 102 in a variety of ways to implement simple or complex policies (e.g., distribution or security rules or algorithms) for example. The policies may be implemented as predefined algorithms that are selected and executed based on information associated with either objects received and stored in the warehouse for distribution or pick up requests received from retrieving system, or both.

Object warehouses may provide a persistent mechanism for communicating information between software systems. For example, an object warehouse may be located at a fixed address on a network. The address may be known by software systems that use the object warehouse for exchanging information. Each software systems may store the address of the object warehouse or multiple object warehouses. Therefore, one software system may exchange information with another software system by sending a data object with a transport request to the address of a particular object warehouse, and the other software system may retrieve the data object by sending a retrieval transport request to the address of the object warehouse, thereby retrieving the data object. Furthermore, in some embodiments the object warehouse may, for example, store identification information for each software system so the object warehouse can determine if a particular software system has any data objects that are designated for pickup for that software system.

In one embodiment, the present invention may distinguish between digital objects (e.g., messages or content) and the transport information for each digital object. Transport information may include instructions (i.e., operations) and attributes for processing the digital objects. Transport instructions are used to specify what actions the object warehouse should perform (e.g., store, retrieve). Each instruction may have a specific workflow for processing a particular digital object. Transport attributes may be used to control how the digital objects are manipulated during a transaction and allow users to specify distribution and security schemes for different digital objects. Object warehouse 100 allows digital objects (also referred to as "data objects") to be stored and manipulated as the data objects are transported between different software systems (or to and from the same software system). Object repository 101 may comprise a variety of different database system configurations including, but not limited to, a single database or multiple databases, and may be managed by one or more database management systems. It is to be understood that other repository technologies could also be used for storing data objects. In one embodiment, data objects 110A may be associated with transport information (transport request 110B). In one example embodiment, transport requests may be implemented as objects ("transport objects"). Transport requests 110B are used by object warehouse 100 to determine how each data object is to be manipulated. As mentioned above, transport requests include instructions that define transportation (e.g., delivery) policies to be carried out on the associated data object. The data objects may be included with, or encapsulated in, the transport information. In other embodiments, the transport information may include a reference to the data object (e.g., a pointer or URL for accessing the data object). Additionally, transport requests 110B may include attributes that may be used for processing data objects. Transport controller 102 may receive information in a transport request 110B and perform one or more of a variety of object handling procedures. Transport controller 102 may use the attributes of the transport request in manipulating the associated data object. In one embodiment described in more detail below, data objects 110A specify rules that may be executed by transport controller software 102. Rules may be added dynamically to transport controller 102 for implementing new distribution policy algorithms, security algorithms, or data object processing algorithms. Accordingly, object warehouse 100 may receive data objects, process the data objects according to rules that are either predefined or received from external sources, and/or send the objects in a controlled manner without necessarily accessing the data objects themselves.

In one embodiment, object warehouse 100 includes authentication functionality for maintaining security of data objects. For example, when a data object (or reference) is stored in object repository 101, it may be associated with transport attributes that may be used to specify security protocols that must be met to access the data object. Additionally, security algorithms (rules) may be stored as data objects in the object repository and executed to authenticate requests to access a stored data object. For example, transport attributes may specify an encryption technique used for encrypting the associated data object. In order for an entity (e.g., another software system) to gain retrieval access to the associated data object, it may be required to supply the appropriate encryption key. Accordingly, the software system requesting access to the object may first access the transport attribute specifying the particular encryption scheme. Next, once the software system knows what encryption is being used, it may retrieve the encrypted data object (e.g., by issuing a request to the object warehouse) and use the necessary key (assuming it has the key or can gain access to the key through other means) for decrypting the object. Encryption and decryption may be performed in the object warehouse, for example. As another example, a retrieving entity may be required to be authenticated as follows. First, the retrieving entity may send a request to the object warehouse to retrieve all data objects designated for that entity. The retrieval request may include attributes specifying the entity making the request. If a data object in the object warehouse is designated for the retrieving entity, then before retrieval access to the data object is permitted, the object warehouse may be required to perform an authentication security algorithm based on the attributes of the retrieving entity. A particular security algorithm to be executed may be associated with the data object. The authentication of the retrieving entity may be performed when the retrieval access is attempted. The algorithm may use the attributes received from the retrieving entity as inputs to the algorithm, and may grant or deny access to the data object based on the retrieving entities particular attribute values, for example. If retrieval access is granted, then the data object may be sent back to the retrieving entity. Similarly, attributes on transport requests may be used to authenticate or perform other security algorithms on incoming transport requests with associated data objects before the data objects are allowed to be stored in the repository. It is to be understood that a variety of security features may likewise be defined using attributes associated with the data objects.

Transactions between object warehouse 100 and other software systems may be conducted across a single network 150 or across other networks 155 with other software systems 155A-D. Networks 150 or 155 may include the Internet, telecommunication networks, cellular networks, wide area networks, local area networks, or wireless networks such as an 802.11 network, WiMax network, or satellite for example.

Figure 2A:
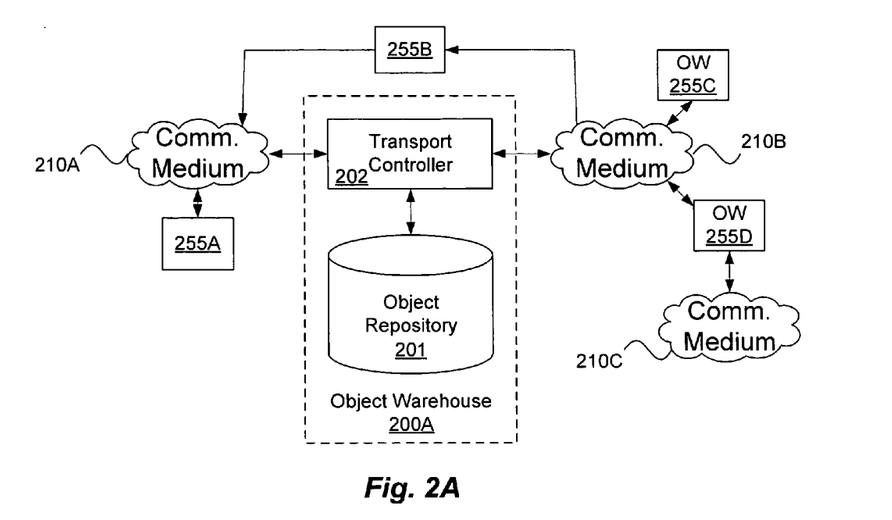
FIG. 2A illustrates object warehousing according to one embodiment of the present invention.

FIG. 2A illustrates object warehousing according to one embodiment of the present invention. More generally, object warehouses may be used across multiple communication mediums to facilitate the flow of information between software systems. For example, a first software system 255A may send and receive information with object warehouse 200A using a first communication medium 210A. A second software system 255B may send information to object warehouse 200A over the first communication medium 210A and receive information from object warehouse 200A over a second communication medium 210B. Some transactions with an object warehouse may be over unidirectional communication channels. An example of such a system may an automobile software system that receives information over a satellite (e.g., digital satellite radio) from an object warehouse, and transmits information to the object warehouse using a wireless communication channel.

In one embodiment, multiple object warehouses 200, 255C, and 255D may be used on the same communication medium (e.g., a network) or across multiple communication mediums to implement a distributed object warehouse. In a distributed object warehouse, each object warehouse may maintain information about the network connectivity of other object warehouses to optimize the flow of information. Object warehouses may be discovered by multicast or registry methods, for example. Warehouses can respond to an internet multicast message or warehouses can register with a recognized central warehouse who maintains and shares the list of active warehouses. Information about the paths between object warehouses may be mapped and distributed to other object warehouses to allow each warehouse to understand the communication mediums available in the distributed warehouse. Clients may select a particular object warehouse in a distributed object warehouse to request service. For example, service may be obtained by selected, learned, directed, or prescribed means. The selected method is where the client selects one of several recommended warehouses to connect with. The learned method is where the client learns that a specific warehouse is better suited to provide the delivery service they would like to request. This is typically a time varying situation hence the learning is ongoing. The directed method is when the client is directed by the recipient to use a specific warehouse. The prescribed method is similar to the selected method but constrained by the communication medium. If the client uses a GPRS connection then a certain warehouse might be prescribed for use with this communication method. For example, one software system (e.g., an application) may send and receive data objects to and from a particular object warehouse in the distributed object warehouse because of network speed or security concerns. Additionally, data objects may be transported between different repositories in a distributed object warehouse based on transport attributes, for example, such as the type of communication medium (e.g., tariffed GPRS, free public WiFi), name space of the transaction (e.g., send this message to all BMWs), request type (e.g., Duplicate Delivery, Pay on Delivery). Furthermore, distributed object warehouses operating across multiple communication mediums may move data objects between object warehouses to a particular object warehouse that is most convenient for the retrieving software system, for example.

Figure 2B:
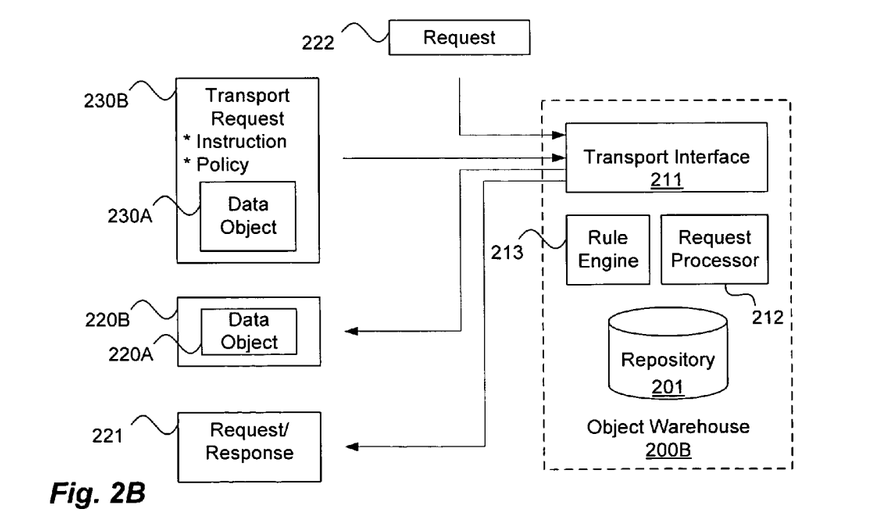
FIG. 2B illustrates an object warehouse according to another embodiment of the present invention.

FIG. 2B illustrates an object warehouse 200B according to another embodiment of the present invention. In this example, object warehouse 200B includes a repository 201, a transport interface 211, a request processor 212, and a rule engine 213. Transport interface 211 receives transport requests with a data object 230B (e.g., store a data object) and without a data object 222 (e.g., retrieve a data object). In this example, transport requests specify an instruction and attributes, including one or more distribution policies. The instruction may include a put or get, for example. Policies may specify one or more predefined distribution policies stored in the object warehouse. Transport requests that contain both instructions (i.e., service requests) and a data object may direct the object warehouse request processor 212 on how to dispatch the data object. The request processor 212 receives transport requests and determines specific workflows or distribution policies to follow for different requests based on the specific instructions, policies, or other attributes of the request, or combinations thereof. Example instructions include, but are not limited to post (store), get (retrieve), connect, disconnect, list, and delete. Instructions may be executed in accordance with workflows or other algorithms that use other transport attributes to determine the distribution or manipulation of data objects.

Furthermore, transport attributes may be stored with each associated data object or a reference to the data object. Attributes may specify distribution policies, which may be stored in the object repository to provide intelligent distribution and/or controlled access to data objects. Distribution policies are predefined algorithms for controlling the distribution of data objects, and may implement security policies by analyzing attributes of retrieval requests to determine what entities can and cannot access particular objects in the object warehouse. Distribution policies may include distribution rules, distribution conditions (e.g., send only after a predefined date), object deletion (destruction) conditions, or specifications of groups or classes of recipients to name just a few. Distribution policies specified in a transport request may access predefined rules (algorithms) stored in the repository and executed by a rule engine 213, for example. Distribution policies may include specifying one or more "retrievers" able to access the data object stored in the object warehouse (e.g., persons, computers, or applications able to retrieve a message). For example, distribution policies may use attributes of a retrieving entity to determine whether or not a data object in the object warehouse is directed toward the entity. Other distribution policies may include multicast information (i.e., specifications of groups the message may be retrieved by), broadcast information (e.g., allowing retrieval of the data object by everyone in a specified domain, class, or list), or replication information, for example. Replication information may include, for example, specifying that the same recipient may retrieve a data object (e.g., a message) 100 times before the message is deleted, multiple consumers (retrievers of the message) may access the message one or more specified times before the message is deleted. In each case, a data object is replicated (copied) as it is retrieved and sent to one or more retrieving entities. Accordingly, data objects may be received in the repository and copies sent to retrieving entities while the data object is maintained in the repository, or data objects may be forwarded to retrieving entities directly and immediately deleted. As is well known by those skilled in the art, there is no material difference between receiving a stored data object or a copy of the stored data object. Using distribution policies and other attributes of the transport request, data objects may be distributed or manipulated according to a variety of attribute values, such as delivery before or after a specified date or time, maximum number of times a data object may be accessed or replicated, deletion of a data object after a certain time period, or delivery of a particular data object to a class of users (e.g., BMW owners), for example. Some embodiments of the present invention allow controlled distribution of data objects (e.g., "content") because the data objects are partitioned from the transport attributes used to control access and distribution to the data objects. Accordingly, example data objects that may be exchanged using an object warehouse include text messages, images, videos, or any other digital representation of information passed from one software system to another (or to and from the same software system) over any communication medium.

As another example of distribution policies, each transport request may include a policy number as one of its attributes. A message may be sent with number and attributes, such as N, X, and Y, for example. One policy number may specify that a message may be retrieved $\underline{N}$ times by one or more unique entities X, where N and X are provided as attributes in the transport request. Another policy, for example, may specify that a message is to be retrieved $\underline{N}$ times without regard to a pickup entity, where N is provided as an attribute in the transport request. Another policy may specify that a message is to be retrieved $\underline{N}$ times to only the specified pickup entity, where N is provided as an attribute in the transport request. Another policy may specify that a message is to be retrieved $\underline{N}$ times using the $\underline{Y}$ communication channel, where N and Y are provided in the transport request. Combination of policies may also be specified and used for distribution, for example.

Distribution and manipulation of data objects based on transport attributes may be controlled by rule engine 213. For example, some software systems may benefit from signals being generated by the object warehouse. Algorithms performed by the object warehouse, such as distribution policies and and security procedures, may be implemented by rule engine 213. Rule engine 213 may access rules for implementing the algorithms. The rules may receive attributes as inputs, for example, and may generate and send signals from object warehouse 200B to one or more software systems. For example, data objects 220A may be sent as replies 220B to transport requests (e.g., get). However, requests or replies 221 (e.g., time delayed or automated replies) may be sent with or without data objects to one or more software system automatically based on rules executed in rule engine 213. Any of a variety of rules for manipulating data objects or distributing of data objects based on stored transport attributes may be specified. New algorithms may be added using an object warehouse administrative management software system described in more detail below.

Figure 3:
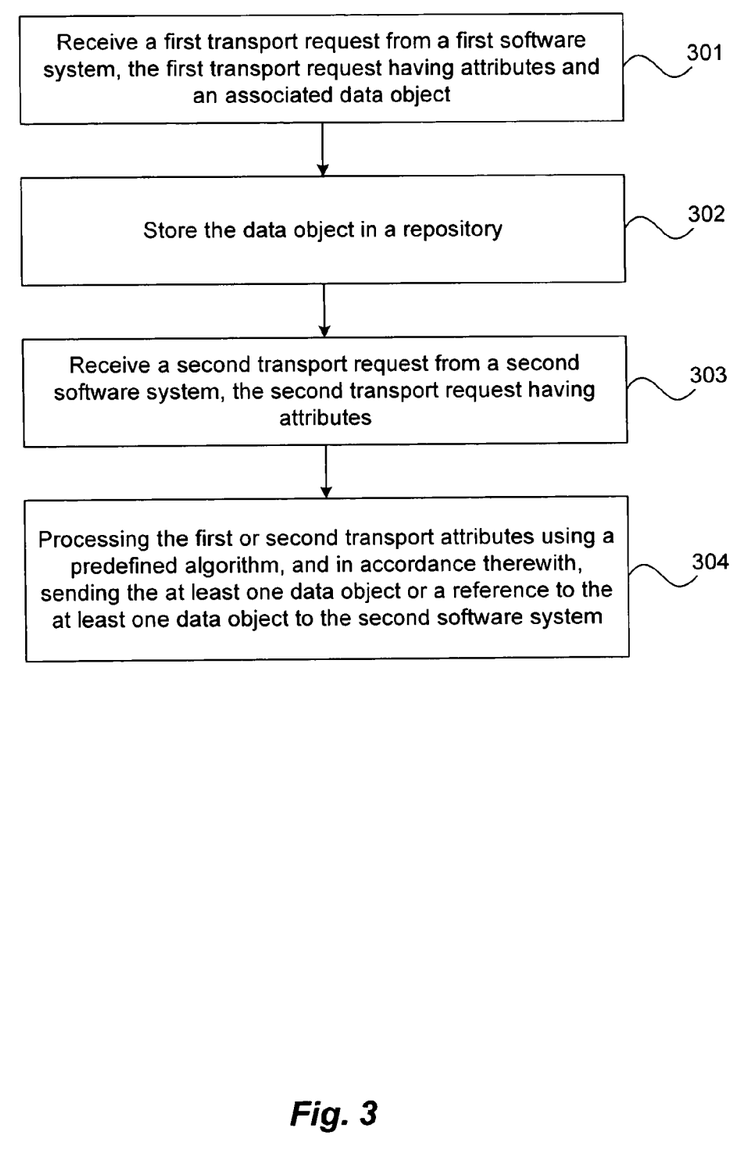
FIG. 3 illustrates a method of exchanging information according to one embodiment of the present invention.

FIG. 3 illustrates a method of exchanging information using an object warehouse according to one embodiment of the present invention. At 301, a first transport request is received from a first software system. The transport request may comprise first attributes, wherein the first transport attributes are associated with at least one data object. At 302, the data object is stored in a repository. At 303, a second transport request is received from a second software system. The second transport request may comprise second attributes. At 303, the first and second transport request attributes may be processed using a predefined algorithm, and in accordance therewith, the data object or a reference to the data object is sent to the second software system. For example, the algorithm may be a rule, which specifies a distribution or security policy. The rule may be stored in the repository and accessed by a rule engine for allowing retrieval access to software systems having particular attributes.

Figure 4:
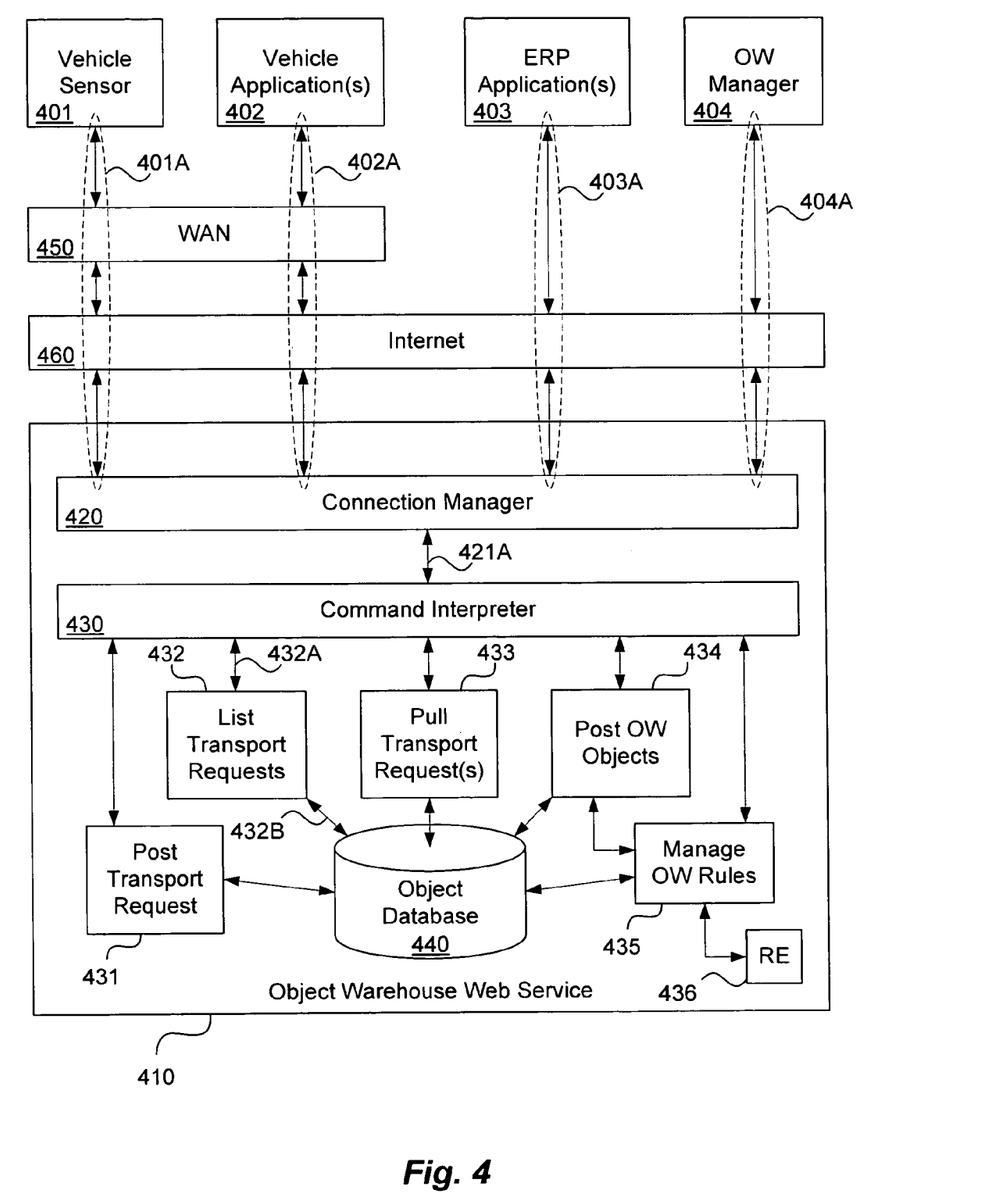
FIG. 4 is an example of an object warehouse implemented as a web service according to one embodiment of the present invention.

FIG. 4 is an example of an object warehouse ("OW") implemented as a software service available on the Internet (i.e., a "Web Service"). In this example, software systems such as vehicle sensor 401, applications 402-403, or an OW manager 404 may invoke the services 431-435 of object warehouse 410 through a web service interface. Each application may establish a connection with a connection manager 420 included with OW 410. Connections to OW 410 may be established serially (one at a time) or in parallel (multiple connections at overlapping times), for example. In this example, information may be exchanged between vehicle sensors 401 and OW 410 over connection 401A. Similarly, information may be exchanged between vehicle software applications 402 and OW 410 over another connection 402A. Both vehicle systems 401 and 402 may establish connections to the Internet 460 using a wide area network 450 such as WiFi, CDMA, GSM, or WiMax. OW 410 may also be coupled to one or more enterprise resource planning ("ERP") applications 403 over connection 403A, which may be a standard internet connection. OW 410 may also be coupled to an object warehouse manager 404 over connection 404A for performing a variety of administrative functions on the object warehouse.

In the case of vehicles or other mobile devices, such connections may be intermittent due to either limited wireless connectivity or turning off the application or its hosting platform (i.e., turning off a cell phone or the vehicle). Features and advantages of some embodiments of the present invention include the ability to exchange information between software systems when one of the software systems may be unavailable. For example, because the object warehouse is persistent, information may be sent in advance of the recipient being powered on, activated, or otherwise instantiated. For instance, an application or software service may send a data object to the OW for use by another part of the same application or service (e.g., at different points in an algorithm or for data generated and used by different internal components). Alternatively, applications or services may generate data objects and store the data objects in the OW so that other applications or software services may retrieve the data objects at a later time (e.g., when the application or service is available for processing more data). As another example, software updates or messages may be sent to the user of a mobile system (e.g., a phone or vehicle) and when the phone or vehicle is turned on the mobile system establishes a connection to the OW and the information is automatically retrieved. In one embodiment, the OW is located at a persistent address on the Internet 460 to make the OW accessible to a wide range of WAN connections. As described above, attributes of the source and/or target software systems may be used to ensure proper delivery of the data objects according to a wide variety of predefined distribution or security algorithms. As described in more detail below, algorithms may be executed based on the type of connection, and may involve forms of authentication specific to the connection type (e.g., SSL certificate exchange for an "http" connection).

In this example, a connection to OW 410 is first established, and then each software system sends a request for the list of objects stored in the OW that are directed to each particular software system. The transport request is passed via internal connection 421A to the OW's command interpreter 430. For example, if the request is determined to include a list instruction, then it may be handed to the "List Transport Requests" process 432 (i.e., list objects held for me). This may take place using a private socket 432A, for example. The process 432 may form a query 432B to an object database 440 to search for objects being held for a particular software system, and execute the query 432B against the database 440 storing the objects. In one embodiment, the result may be priority structured into a reply to the requesting software system using the established connection. A list of data objects may be sent back to a software system so that a user may select one or more of the data objects for retrieval, for example.

The requesting software system may receive the list and determine which if any of the objects it wishes to retrieve. The software system may then send an instruction to the OW that is interpreted to activate the "Pull Transport Request(s)" process 433 (i.e., "Pickup Object Held for Me"). This request may be delivered via the open connection to the OW's command interpreter 430. It is then forwarded via a private socket 433A to the "Pull Transport Request(s)" process 433. The process forms a query to fetch the object and returns it to the software server. In one embodiment, the open connection may be used for this transaction. Additionally, OW 410 may include instructions for pulling one object at a time or pulling multiple objects in one transaction.

Any one of software systems 401-404 may issue a transport request including a data object to be stored in OW 410. For example, ERP application 403 may issue an object transport request ("OTR") via the connection 403A requesting to "Dropoff Objects for Pickup." This OTR arrives at the command interpreter 430 and is sent to the post transport request process 431 (i.e., "Dropff Objects for Pickup"). This process may then forms a query to add the OTR into the database of objects being stored for pickup by other software systems.

As mentioned above, OW 410 may also be coupled to an object warehouse manager 404 for performing a variety of administrative functions on the OW. For example, activity of OW 410 may be logged, and the log may be accessed by the OW Manager Application 404. Additionally, internal working attributes of OW 410 may be adjusted by the OW Manager Application. The OW Manager Application may deliver commands to the OW in the form of object transport requests ("OTR"), wherein the data object being delivered is a new OW command. The new command may be stored in the OW using post OW object process 434 (i.e., "objects for storage in the OW"). OW 410 may generate a response to the OW Manager Application delivering an OTR to the Manager Application 404 through the command interpreter 430. The OTR response generated by the OW is sent to post transport request process 431. Accordingly, the next time OW Manager Application 404 requests a list of objects being held it will see the response object waiting for pickup. The example implementation shown and described above with reference to FIG. 4 is only one example implementation.

As mentioned above, the OW supports the ability to send signals to (i.e., Callback) software systems, for example, when an event occurs. For instance, OW 410 may include a rule engine 436 ("RE") that may be provide with new rules using the same dropoff/pickup mechanism that has been described for the OW Manager 404. In this case OTRs are dropped off by any application or system to be picked up by the OW. The object in these OTRs may include a rule definition or attributes for allowing the OW to successfully signal (Callback) an application or software system. The rules may be managed inside the OW by the "Manage OW Rules" process 435. The rules themselves may be stored database 440 and accessed via queries.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of exchanging information comprising:
   receiving a first transport request, the first transport request comprising one or more first transport attributes, wherein the one or more first transport attributes are associated with a first data object;
   storing the one or more first transport attributes and the first data object or a reference to the first data object in a repository;
   receiving a second transport request, the second transport request comprising one or more second transport attributes, wherein the first and second transport requests are received across one or more networks;
   executing an algorithm on a computer system for generating a response to the second transport request based on the first or second transport attributes, wherein the one or more first transport attributes of the first transport request specify a distribution policy, and wherein the algorithm is a specified distribution policy from a plurality of distribution policies for providing retrieval of the first data object;
   receiving a second data object comprising a rule; and
   accessing said rule and processing the first data object on the computer system based on the first or second transport attributes and said rule.

2. The method of claim 1 wherein the plurality of distribution policies include one or more broadcast, multicast, replication, or time based distribution policies.

3. The method of claim 1 wherein the first transport request is received from a first software system and the second transport request is received from a second software system.

4. The method of claim 1 further comprising signaling a software system based on the first or second transport attributes.

5. The method of claim 1 wherein the algorithm performs an authentication using the first or second transport attributes.

6. The method of claim 1 wherein the first transport request is received over the Internet and includes an instruction for activating a storing software service, and the second transport request is received over the Internet and includes an instruction for activating a retrieving software service.

7. The method of claim 1 further comprising:
   establishing a first connection with a first software system over a first communication medium; and
   establishing a second connection with a second software system over a second communication medium.

8. The method of claim 1 wherein the repository is a database system.

9. The method of claim 1 wherein the repository is a distributed database system.

10. The method of claim 1 wherein the first transport request or the second transport request is received from an application, a mobile device, a software service, or an object warehouse.

11. The method of claim 1 wherein the first transport request or the second transport request is received from a vehicle.

12. The method of claim 1 wherein the repository is accessed using a fixed network address.

13. The method of claim 1 wherein the algorithm causes the stored data object to be replicated based on at least a portion of the first and second attributes.

14. The method of claim 1 wherein the algorithm is a distribution policy algorithm.

15. The method of claim 14 wherein the distribution policy algorithm specifies a communication medium.

16. The method of claim 14 wherein the distribution policy algorithm specifies attributes of retrieving entities.

17. The method of claim 14 wherein the distribution policy algorithm specifies a maximum number of copies of the data object.

18. The method of claim 14 wherein the distribution policy algorithm specifies a time for retrieving the data object.

19. The method of claim 1 wherein the algorithm is a security algorithm.

20. The method of claim 19 wherein the security algorithm performs authentication.

21. The method of claim 19 wherein the security algorithm performs encryption or decryption.

22. The method of claim 19 wherein the security algorithm performs authentication based on a type of connection.

23. The method of claim 1 wherein the algorithm causes copies of the data object to be sent to a predefined group of recipients.

24. The method of claim 1 wherein the algorithm causes a copy of the data object to be sent to a single recipient.

25. The method of claim 1 wherein the algorithm allows a recipient to retrieve a copy of data object a predetermined number of times before the object is deleted.

26. The method of claim 1 wherein the algorithm is a time based algorithm.

27. The method of claim 1 wherein the repository is accessed using a fixed network address.

28. A computer system comprising:
a transport controller for receiving first and second transport requests across one or more networks, the first transport request including first transport attributes and associations to a first data object, the second transport request including an associated second data object comprising a rule, wherein said transport controller manipulates the distribution of data objects based on the first transport attributes;
an object repository for storing the first data object and the first transport attributes; and
a rule engine for accessing and executing policies, wherein the rule engine, operating on said computer system, executes said rule,
wherein received first transport attributes specify one or more policies for controlling the processing of data objects from the object repository, and
wherein the transport controller receives a third transport request comprising second transport attributes, the computer system executing an algorithm for generating a response to the second transport request based on the first or second transport attributes,
wherein the first transport attributes of the first transport request specify a distribution policy, and wherein the algorithm is a specified distribution policy from a plurality of distribution policies for providing retrieval of the first data object, and
wherein the computer system accesses said rule and processes the first data object based on the first or second transport attributes and said rule.

29. The system of claim 28 wherein the transport controller comprises a plurality of software services.

30. The system of claim 29 wherein the plurality of software services comprise storing a data object and associated transport attributes in said object repository and retrieving a data object from said object repository.

31. The system of claim 28 wherein the transport controller is coupled to at least two different communication mediums.

32. The system of claim 28 wherein the transport controller receives one or more additional transport requests comprising attributes, and data objects are retrieved by the additional transport requests based on the attributes of the additional transport requests and the specified policies.

33. The system of claim 28 wherein the policies are distribution policies.

34. The system of claim 28 wherein the policies are security policies.

35. The system of claim 28 wherein the object repository stores said data object.

36. The system of claim 28 wherein the object repository stores a reference to said data object.

37. The system of claim 28 wherein the rule engine manipulates data objects based on transport attributes according to rules stored in said object repository.

38. The system of claim 28 wherein the transport controller is couple to at least one vehicle.

39. The system of claim 28 wherein the repository is accessed using a fixed network address.

* * * * *